May 8, 1928.  
C. O. THOMAS  
SLIPPING DRIVE  
Filed July 13, 1925

Inventor
Cecil Oldrieve Thomas
By
Attorney.

May 8, 1928.  1,669,359

C. O. THOMAS
SLIPPING DRIVE
Filed July 13, 1925   3 Sheets-Sheet 2

Inventor
Cecil Oldrieve Thomas
By
Attorney

May 8, 1928.

C. O. THOMAS 1,669,359

SLIPPING DRIVE

Filed July 13, 1925

Inventor
Cecil Oldrieve Thomas
By
Attorney

Patented May 8, 1928.

1,669,359

UNITED STATES PATENT OFFICE.

CECIL OLDRIEVE THOMAS, OF MONTREAL, QUEBEC, CANADA.

SLIPPING DRIVE.

Application filed July 13, 1925. Serial No. 43,419.

This invention relates broadly to yielding power transmission means for use between prime movers and the machines driven thereby, or elsewhere, and relates more particularly to that class of apparatus designed to maintain driving relation between the prime mover and the driven machine except under predetermined overload conditions such as would be injurious to either the prime mover or driven machine or both, the apparatus being designed to automatically restore normal driving relation as soon as the abnormal or overload conditions cease to exist. The invention further relates to a device permanently operative to transmit power in variable amount up to a regulatable predetermined maximum within the safe capacity of the prime mover and without regard to whether the amount of power so transmitted is sufficient to operate the driven machine.

Because of the characteristics of the invention and of concrete embodiments thereof, it is preferred to denominate the same "slipping drive" to distinguish from the term "clutch", which is usually applied to and associated in the minds of the majority with apparatus for definitely connecting and disconnecting driving and driven elements.

The primary object of the invention is to provide a power transmitting means, which will transmit a maximum of torque when starting in order to overcome inertia, etc. of the driven machine and will thereafter transmit torque in amount decreasing as the speed of the prime mover increases, thereby to safeguard the prime mover and driven machine against the effects of any sudden stoppage of the machine due to external causes.

A further object is to provide a drive or transmission specially adapted for use with electric motors to enable the full starting torque of the motor to be availed of, the drive operating automatically to reduce the torque transmitted, as the motor comes to normal speed and normal load conditions, to a point where the torque is only slightly greater than the load; the drive being adapted to slip when the load exceeds the torque transmitted, so as to avoid damage to the driving and driven elements.

Another object is to provide a drive particularly adapted to elevator or similar work in which less power is required when operating in one direction, and which will automatically transmit different amounts of torque according to the direction of operation.

Still another object of the invention is to provide a slipping drive or transmission simple and inexpensive in construction and which may be maintained at low cost.

Various other objects and the advantages of the invention may be ascertained from the following description and the drawings forming a part thereof.

Briefly, the invention resides in providing a drum to be connected to a driven machine and a casing encircling the drum to be connected to a prime mover, the casing carrying shoes spring pressed against the drum through a system of levers, the arrangement being such that the spring pressure is opposed by centrifugal force acting on the shoes and levers. The shoes are so connected to the casing that the direction of revolution affects the grip of the shoes on the drum in much the same way as obtains in a band brake.

In the accompanying drawings which illustrate various, but by no means all, embodiments of the invention and to which illustrated embodiments and the details thereof the invention is not confined:—

Referring more particularly to the drawings, 11 designates a circular rimmed casing, within which a drum 12 is located in such a manner as to be encircled by the casing rim. The casing is conveniently rotatably mounted on a shaft 13 to which the drum is keyed. With such an arrangement, the casing is provided with an elongated hub 14 to which a prime mover may be connected directly, or by any suitable means such as gearing. For the purposes of the following description the casing will be regarded as the driving elements and the drum as the driven element.

Figure 4:
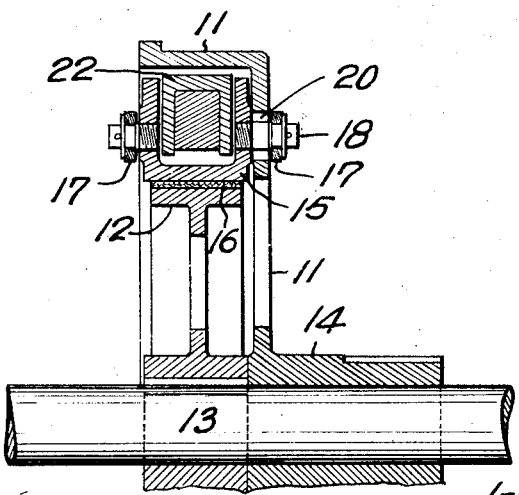
Fig. 4 is a fragmentary central section on the line 4—4 of Figure 2.

A pair of shoes 15 are provided to fit the drum and have suitable lining 16. These shoes are preferably channel-shaped in cross section and arranged with their flanges outward, that is, with their webs adjacent the drum. The shoes may be connected to the casing in a variety of ways, for example, by means of links 17 pivotally connected to the shoes by studs 18 located in the shoe flanges midway between the ends of the shoes, as shown, or at any other points between the ends of the shoes. The links are pivotally connected to the casing by bolts or studs 19. Preferably, the links 17 are provided on opposite sides of the shoes, as shown, and in such case the studs 18 at the back will pass through substantially radial slots 20 in the casing (Figure 4), permitting movement of the shoes toward and away from the drum. The central support of the shoes illustrated is preferred, since it permits the shoes to most easily adjust themselves to the drum and equalizes wear of the linings, one end of each shoe being pivoted at a point substantially fixed relatively to the casing by means of a pin 21 passing through the flanges thereof.

Figure 1:
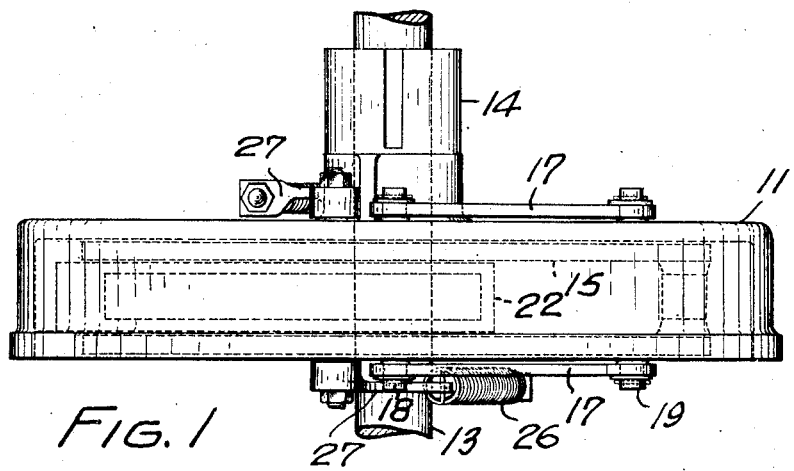
Fig. 1 is a plan view of the drive.
Figure 2:
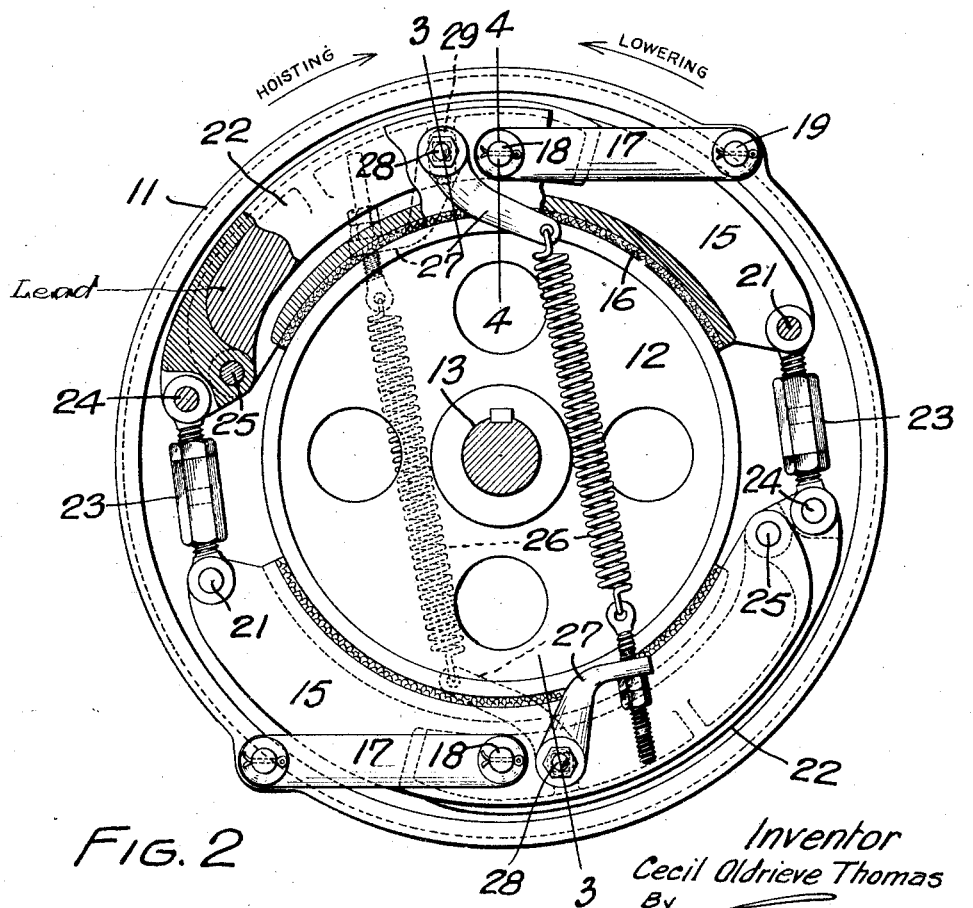
Fig. 2 is a side elevation with parts broken away to more clearly disclose the construction and relation of the same.
Figure 5:
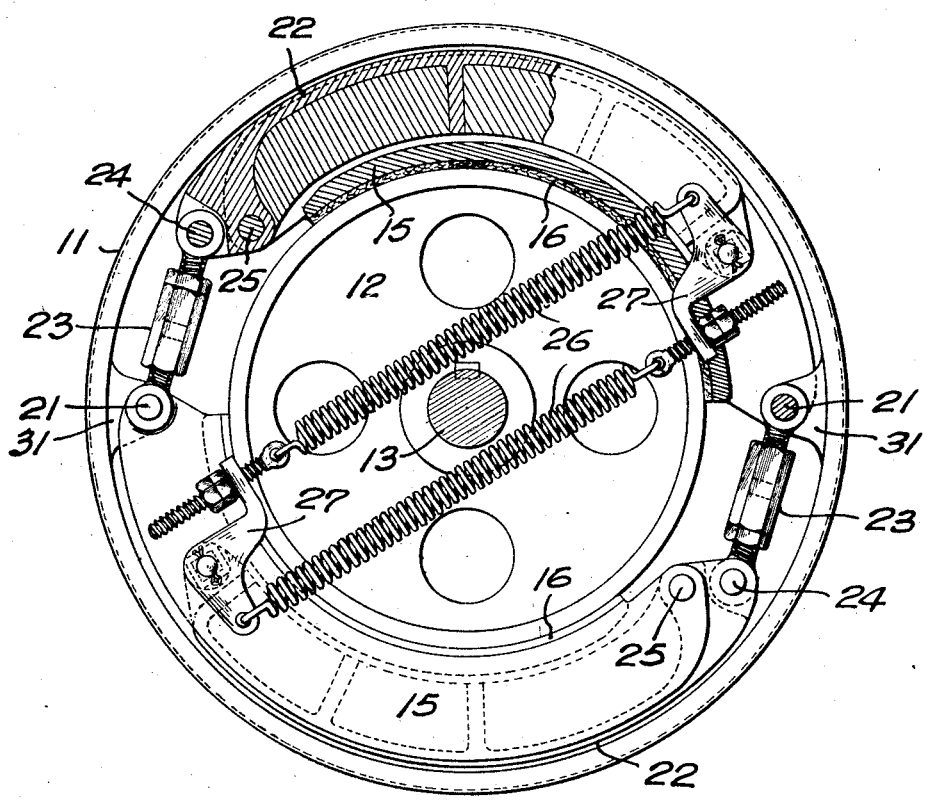
Fig. 5 is a view similar to Figure 2 showing a modified construction.

Levers 22 are disposed outwardly of the shoes and substantially parallel thereto, being preferably located between the flanges of the shoes. One end of each of these levers is connected by an adjustable link 23 with a nominally fixed point represented by the pin 21, the links being pivotally connected to the levers by pins 24 and the links being pivotally related to the pins 21. At points quite close to the pins 24, the levers are connected to the remaining or free ends of the shoes by pins 25 passing through the levers and shoe flanges. These levers are normally clear of the shoe webs, as shown in Figures 2 and 5. The levers are quite heavy in order to utilize centrifugal force and may be formed hollow and filled with lead in order to increase the weight in a given space.

Figure 3:
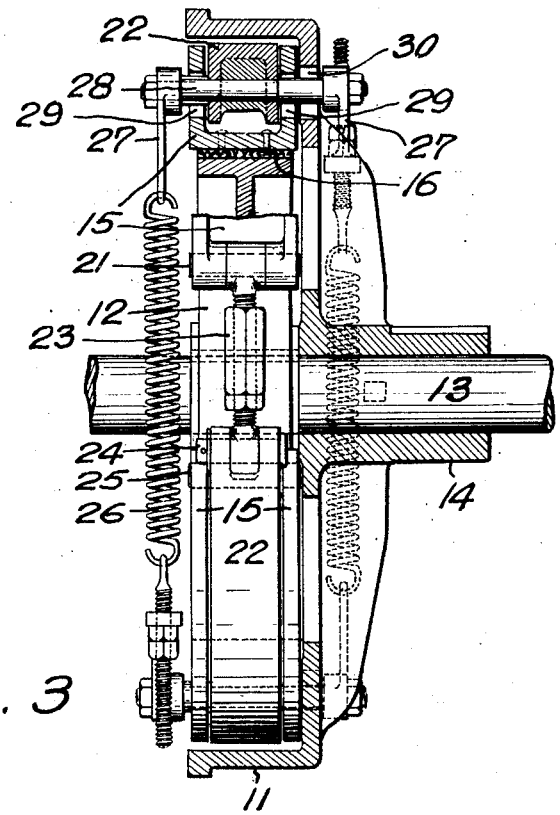
Fig. 3 is a view showing the casing and certain parts in section on the line 3—3 of Figure 2.

Load springs 26 are connected between the levers, the attachment being at any suitable points in the lengths of the levers. As illustrated, the attachment is near the free ends of the levers in order to obtain the desired effect with relatively light springs. If the points of spring attachment are nearer the fulcrum pins 25, the amount of spring relaxation which will result from wear of the shoe linings will be reduced but heavier springs will be necessary to obtain the same effect. Preferably, two springs are used, one on each side of the drive and connected by equalizing levers 27 including spindle portions 28 passing through slots 29 (Figures 2 and 3) in the shoe flanges and slots 30 in the casing (Figure 3) disposed to permit approximately radial movement of the spindle parts 28. The springs are adjustably connected to the equalizers so that the tension may be regulated.

As shown in Figure 5, the shoes may be pivoted directly to the casing and without intervention of links, the attachment being effected by securing the pins 21 in lugs 31 on the casing. The points of attachment of the springs are also shown at the extreme ends of the levers and the springs are shown both on the same side of the drive.

The operation is extremely simple. The springs act through the levers to press the shoes against the drum. When the casing is rotated, it carries with it the shoes which, being frictionally engaged with the drum, rotate the same. When starting the full force of the springs, multiplied through the lever system, is effective to hold the shoes against the drum but, as the rotative speed increases, centrifugal force exerts itself on the levers and shoes in opposition to the springs and tends to move the shoes away from the drum. By regulating the tension of the springs, the device may be adjusted to transmit different torque and power at any given speed. The drive always transmits a decreasing amount of torque up to the speed for which it is adjusted, at which speed the power absorbed exceeds the grip of the shoes and slipping occurs. This not only prevents the driven machine being raced, but also ensures only a small margin of transmission capacity over the load at normal speeds, so that any obstruction in the driven machine will cause the drive to slip and thus save the prime mover from being stalled and the driven machine from damage. It is to be noted that when slip occurs, the drive does not actually let go but continues to take power, which is absorbed in friction, thus saving the prime mover from racing. When a drive as illustrated is used under regularly varying load conditions, such as in elevator service with the greater load when hoisting, the inclination of the links upon rotation of the casing in the hoisting direction (the drum tending to rotate oppositely), gives the shoes a natural tendency to hug the drum (as in a band brake when the drum rotates in the contracting direction of the band), thus ensuring greater power transmission capacity than when the casing is rotating in the opposite direction and the inclination of the links tends to throw the shoes away from the drum. The best results are obtained when the links 17 extend from the casing contrawise to its direction of rotation under the greatest load. The arrangement illustrated is that suitable for the most usual condition where the maximum load is sustained in hoisting. If the maximum load is usually encountered when lowering, adjustment should be made to reverse the position of the links. This can be accomplished by disconnecting the links at either 18 or 19, swinging the links to an opposite inclination to the casing, and shifting the closed chain of shoes 15 and levers 22 sufficiently for reconnection of the links.

It will be observed that the alternately arranged levers and shoes with the connecting links 23 constitute a flexible closed chain system encircling the drum which may be contracted and expanded, operation in one of these two ways being effected by centrifugal force and in the other way by the springs.

It will further be observed that since the pivotal points 24 of the levers are not fixed in the member 11, it is possible for the levers to have bodily movement relatively of the drum and of the member 11, either alone or in combination with an arcuate movement about the pivots 24. In the form shown in Figure 2 such bodily movement is possible for the shoes also.

The drive is particularly adaptable for use with electric motors, especially A. C. motors, driving elevators, sluice gates, conveyors, automatic stokers and many other types of machinery. In the case of elevators, sluice gates and the like, it will operate to prevent damage thereto as well as stalling or racing of the motors if an obstruction should be encountered or if, through failure of cut out switches or carelessness of attendants, the power should not be cut off when the elevator or gate reaches either limit of travel. It is also particularly applicable to conveyor drives, as in grain elevators, to prevent fire producing friction of drive pulleys on stalled conveyor belts.

As already stated, the drive is capable of numerous modifications in detail which may be necessary to accommodate it to a particular service. When properly designed for the service to which it is put, the drive is capable of adjustment to varying conditions of the service, in most cases merely by adjustment of spring tension, or by varying the weight of the levers, or both. A drive may also be readily adjusted for different service by changing the length or inclination direction of the shoe supporting links. While only two shoes and levers have been shown, it will be understood that the number may be varied as desired.

Having thus described my invention, what I claim is:—

1. A device of the class described comprising driving and driven members, the latter contained within the former, shoes each pivotally mounted at one end at a fixed point in the driving member, levers overlying the shoes and each pivotally mounted at one end in the driving member adjacent the free end of the underlying shoe, a spring connected between said levers and actuating the same to press the shoes against the driven member, said levers and shoes tending upon development of centrifugal force due to rotation of the device to release the driven member against the action of said spring.

2. A device of the class described, comprising a drum to be driven, a driving casing encircling the drum, shoes to engage the exterior of the drum carried by the casing, levers pivotally related to the casing to act upon said shoes carried by the casing, springs connected between the levers to draw the shoes inwardly against the drum, said shoes and levers being free to move outwardly of the drum by centrifugal force developed upon rotation of the device.

3. A device of the class described comprising a drum to be driven, a driving casing encircling the drum, shoes bearing against the outer surface of said drum and pivotally related each at one end to pivots relatively stationary in the casing, levers lying outwardly of the shoes and pivotally related each at one end to said relatively stationary pivots and pivotally related adjacent said points of pivotal relation to the free ends of the shoes, and springs connected between the levers and operating the levers to press the shoes against the drum.

4. A device of the class described, including a casing, a drum therein, a shoe on the drum pivotally supported at one end at a relatively stationary point in the casing, a lever pivotally supported at one end at a second relatively stationary point in the casing adjacent the free end of the shoe, said lever lying substantially parallel with and outside the shoe, means pivotally relating the free end of the shoe to the lever at a point adjacent the pivotal support of the lever, and a spring connected to the lever to draw the lever and shoe toward the drum.

5. A device of the class described including, a casing, a drum therein, a shoe on the drum pivotally supported at one end at a relatively stationary point in the casing, a lever lying substantially parallel with and outside the shoe and pivotally related adjacent one end to the free end of the shoe thereby forming long and short arms in said lever, a link pivotally connected at one end to the extremity of the short arm of said lever and pivotally connected at the opposite end at a second relatively stationary point in the casing, and a spring connected to the long arm of said lever to urge the long arm of the lever and the shoe toward the drum.

6. A device according to claim 5, embodying the shoes and levers in duplicate, the link of each shoe being connected at the same relatively stationary point as the shoe inside the other lever and the spring being tensioned between the two levers, in combination with tension adjusting means for the spring.

7. In a device of the class described, driving and driven members one of which is a drum, a shoe connected to the other member engaging the drum and formed channel shaped in cross-section, and a shoe operating lever lying substantially parallel and substantially entirely in the channel thereof.

8. In a device of the class described, a drum, a shoe engaging the drum formed channel-shaped in cross-section, and pivotally supported at one end, a lever lying substantially parallel with the shoe and in the channel thereof, and pivotally related at an intermediate point with the free end of the shoe, an end of said lever projecting beyond an end of the shoe and being pivotally supported.

9. In a device of the class described, a drum, shoes thereon, levers pertaining to the shoes and each pivotally related to the shoe pertaining thereto, and links pivotally connected between the shoes and the levers pertaining to an adjacent shoe, the whole forming an endless structure encircling the drum, and springs connected between the levers and operative to contract the structure upon the drum, the structure tending by centrifugal force developed upon rotation thereof to expand against the action of the springs for release of the drum.

10. In combination with a device according to claim 9, a driving member carrying the shoes, levers and springs.

11. In a device of the class described, a drum, a driving member, a shoe on the drum and a link pivotally connected at one end to the shoe midway between the ends thereof and pivotally connected at the opposite end to the driving member at a fixed point and means operating independently of the link to urge the shoe against the drum.

12. In a device of the class described, a drum, a driving member, a shoe on the drum and a link pivotally connected at one end to the shoe and pivotally connected at the opposite end to the driving member, said link being disposed to be in tension when the driving member is rotating in a direction to move a load connected to the drum against the force of gravity and means operating independently of the link to urge the shoe against the drum.

13. In a device of the class described, a drum, shoes thereon, levers pertaining to the shoes and each pivotally related to the shoe pertaining thereto, and links pivotally connected between the shoes and the levers pertaining to an adjacent shoe, the whole forming an endless structure encircling the drum, and springs connected between the levers and operative to contract the structure upon the drum, the structure tending by centrifugal force developed upon rotation thereof to expand against the action of the springs for release of the drum, a driving member, and links severally pivotally connected at one end to the shoes and pivotally connected at the opposite ends to the driving member.

14. In a device of the class described, a drum, shoes thereon, levers pertaining to the shoes and each pivotally related to the shoe pertaining thereto and links pivotally connected between the shoes and the levers pertaining to an adjacent shoe, the whole forming an endless structure encircling the drum, equalizing levers pivotally related to said first mentioned levers, and springs connected between the equalizing levers and operative to contract the structure upon the drum, the structure tending by centrifugal force developed upon rotation thereof to expand against the action of the springs for release of the drum.

15. A device according to claim 14, in which the equalizing levers extend through the levers carrying them and the springs and links are located on opposite sides of the device.

16. In a device of the class described, a drum, an operating lever pivotally mounted at one end, a shoe on the drum pivotally connected at one end to the lever and pivotally mounted at the opposite end, and a carrier for the lever and shoe, said lever being bodily movable relatively of the drum by centrifugal force.

17. In a device of the class described, a drum, an operating lever pivotally mounted at one end, a shoe on the drum pivotally connected at one end to the lever and pivotally mounted at the opposite end and a carrier for the lever and shoe, said lever and shoe being bodily movable relatively of the drum by centrifugal force.

18. In a device of the class described, a drum, an operating lever pivotally mounted at one end, a shoe on the drum pivotally connected at one end to the lever and pivotally mounted at the opposite end, a spring connected to the lever and operating to urge the shoe against the drum, and a driving member on which the shoe and lever are mounted, said lever being bodily movable relatively of the drum and arcuately movable, both by centrifugal action.

19. In a device of the class described, a driving member, a drum, a flexible closed chain system carried by the driving member encircling the drum including a plurality of shoes on the drum and a plurality of shoe operating levers alternated with the shoes, said system being contractible and expansible and adapted for operation in one of the said two ways by centrifugal force, and a mechanical device to operate the system oppositely to centrifugal force.

20. In a device of the class described, a driving member, a drum, an expansible and contractible closed chain system encircling the drum including shoes on the drum and operating levers alternated with the shoes, the shoes being connected to the driving member independently of the levers, and actuating springs connected between the levers, the said system being operable with one effect by the springs and with opposite effect by centrifugal force developed in the system upon rotation of the device.

21. In a device of the class described, a drum, a plurality of shoes thereon each pivotally mounted at one end, an operating lever for each shoe pivotally mounted at one end and pivotally connected to the free end of the shoe pertaining thereto and further connected at its pivotally mounted end to the pivotally mounted end of the adjacent shoe.

22. In a device of the class described, a drum, a plurality of shoes thereon each pivotally mounted at one end, an operating lever for each shoe pivotally mounted at one end and pivotally connected adjacent its pivotal point to the free end of the shoe pertaining thereto and further connected at its pivotally mounted end to the pivotally mounted end of the adjacent shoe.

23. In a device of the class described, a drum, a plurality of shoes thereon each pivotally mounted at one end, an operating lever for each shoe pivotally mounted at one end and pivotally connected adjacent its pivotal point to the free end of the shoe pertaining thereto and further connected at its pivotally mounted end to the pivotally mounted end of the adjacent shoe, and springs means connected to the levers operating to urge the shoe against the drum, and a driving member on which the shoes and levers are mounted.

24. In a device of the class described, a drum, a plurality of shoes thereon each pivotally mounted at one end, an operating lever for each shoe pivotally mounted at one end and pivotally connected adjacent its pivotal point to the free end of the shoe pertaining thereto and further connected at its pivotally mounted end to the pivotally mounted end of the adjacent shoe, and spring means connected between the levers to urge the shoes against the drum, said shoes and levers all tending by centrifugal action to release the drum against the action of the springs.

In witness whereof, I have hereunto set my hand.

CECIL OLDRIEVE THOMAS.